United States Patent
Kuji et al.

(10) Patent No.: US 8,102,300 B2
(45) Date of Patent: Jan. 24, 2012

(54) SECONDARY SURVEILLANCE RADAR

(75) Inventors: Yoshinori Kuji, Kawasaki (JP);
Takafumi Takeda, Kawasaki (JP);
Takafumi Yamada, Kawasaki (JP);
Yoshirou Aoki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/642,076

(22) Filed: Dec. 18, 2009

(65) Prior Publication Data
US 2010/0289689 A1 Nov. 18, 2010

(30) Foreign Application Priority Data
May 15, 2009 (JP) ................................. 2009-118473

(51) Int. Cl.
*G01S 13/00* (2006.01)
(52) U.S. Cl. ................................. 342/29; 342/32; 342/37
(58) Field of Classification Search ............... 342/29–40
See application file for complete search history.

(56) References Cited

U.S. PATENT DOCUMENTS

| | | | |
|---|---|---|---|
| 6,094,169 A * | 7/2000 | Smith et al. | 342/465 |
| 2004/0130479 A1 * | 7/2004 | Lo et al. | 342/29 |
| 2004/0233095 A1 * | 11/2004 | Galati et al. | 342/37 |
| 2005/0083226 A1 * | 4/2005 | Kuji et al. | 342/29 |
| 2006/0181447 A1 * | 8/2006 | Kuji et al. | 342/32 |
| 2006/0197700 A1 * | 9/2006 | Stevens et al. | 342/37 |

FOREIGN PATENT DOCUMENTS

| | | |
|---|---|---|
| EP | 1 901 090 A1 | 3/2008 |
| JP | 2007-248296 | 9/2007 |
| JP | 2008-146450 | 6/2008 |

OTHER PUBLICATIONS

Michael C. Stevens, "Secondary Surveillance Radar", 1988, ISBN 0-89006-292-7, pp. 80-87 and p. 267.
Gonzalo de Miguel Vela, et al., "Integration of ADS-B Surveillance Data in Operative Multiradar Tracking Processors", Information Fusion, IEEE, XP031395509, Jun. 30, 2008, pp. 1-8.
O. Baud, et al., "Radar / ADS-B data Fusion Architecture for Experimentation Purpose", Fusion 2006 Inst. of Elec. and Elec. Eng. Computer Society US, IEEE, XP031042567, Jul. 1, 2006, pp. 1-6.
Search Report issued Sep. 23, 2010, in European Patent Application No. 09252839.7-2220.

* cited by examiner

*Primary Examiner* — Timothy A Brainard
(74) *Attorney, Agent, or Firm* — Oblon, Spivak, McClelland, Maier & Neustadt, L.L.P.

(57) ABSTRACT

A transmitter 122 transmits interrogations to aircraft airborne in a coverage, a receiver 123 receives signals transmitted from aircraft airborne in the coverage, reply analyzers 132b and 133b analyze a reply responding to an interrogation transmitted from the transmitter, as the reply is detected from signals received by the receiver, and a squitter analyzer 132d analyzes an extended squitter, as the extended squitter is detected from the signals received by the receiver.

1 Claim, 9 Drawing Sheets

| DF:5 (10001) | CA:3 | AA:24 | ME:56 | PI:24 |
|---|---|---|---|---|
| (DF=17) | | | | (CODE ZERO) |

FIG. 5B

| DF:5 (10010) | CA:3 | AA:24 | ME:56 | PI:24 |
|---|---|---|---|---|
| (DF=18) | | | | (CODE ZERO) |

SECONDARY SURVEILLANCE RADAR

CROSS REFERENCE TO RELATED APPLICATIONS

The present application claims the benefit of priority under 35 U.S.C. §119 to Japanese Patent Application No. 2009-118473, filed on May 15, 2009, the entire contents of which are incorporated herein by reference.

BACKGROUND OF THE INVENTION

1. Field of Art

The present invention relates to a secondary surveillance radar (SSR) making use of an extended squitter received from aircraft.

2. Description of Relevant Art

Figure 1:
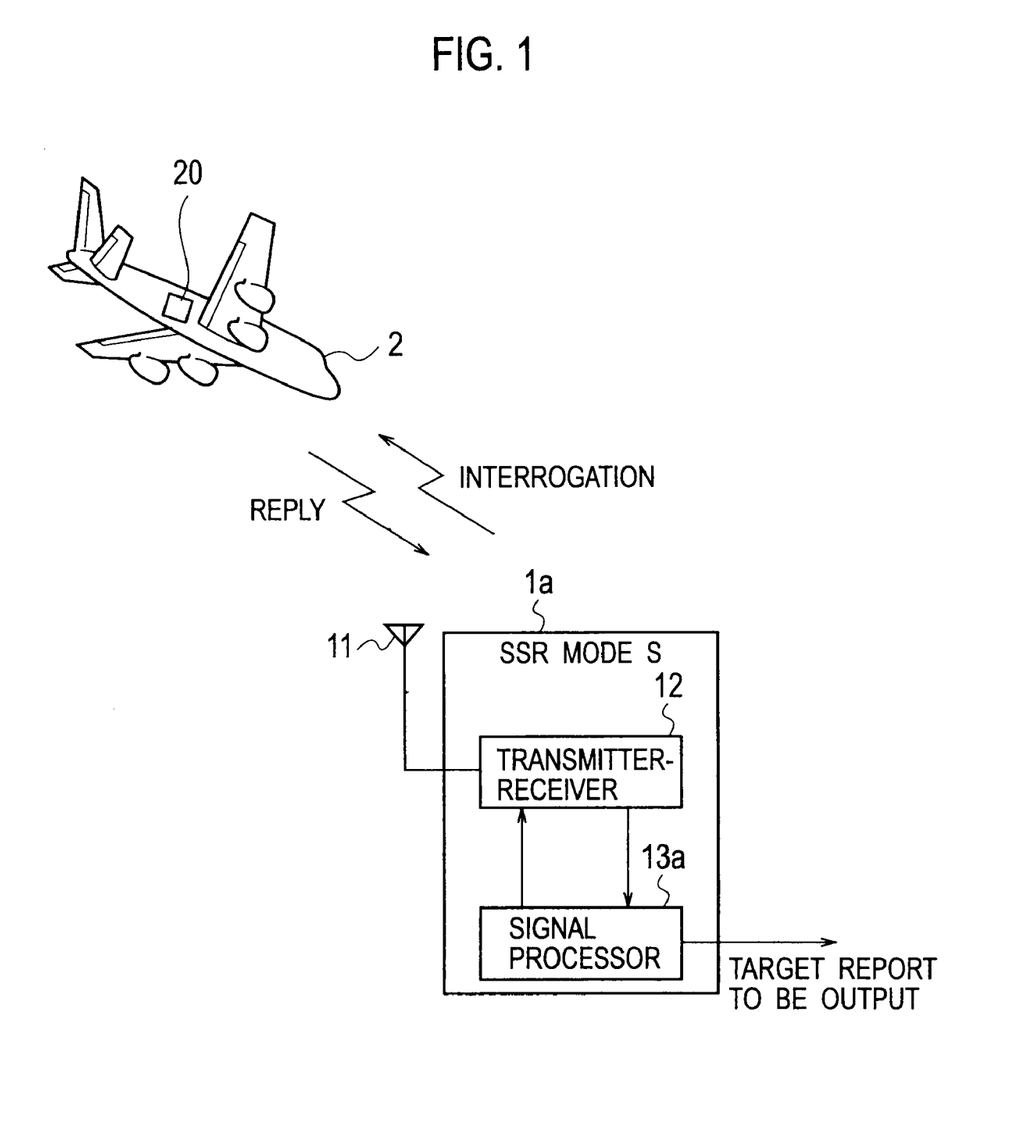
FIG. 1 is an illustration of transaction between a typical SSR mode S and a transponder.

FIG. 1 illustrates an SSR 1a installed at a ground station. It has a transmitter-receiver 12 adapted for transmission of signals as interrogations to transponders 20 boarded on aircraft 2, and for reception of signals as replies transmitted from transponders 20 on aircraft 20 in response to interrogations. The transmitter-receiver 12 implements various processes under control of a signal processor 13a. The SSR 1a is adapted for such signal transmission and reception to acquire necessary information for air traffic control.

There are two types of transponders: an ATCRBS (Air Traffic Control Radar Beacon System) transponder that has been used since ever, and a mode S transponder that has been developed later than the ATCRBS transponder. They employ different signals for transmission and reception. In FIG. 1, the SSR 1a is an SSR mode S (secondary surveillance radar mode S) system cooperative with both ATCRBS transponder and mode S transponder, so it is adaptive as an SSR for surveillance, even for ATCRBS aircraft (aircraft with an ATCRBS transponder on board), as well as for mode S aircraft (aircraft with a mode S transponder on board).

Figure 2:
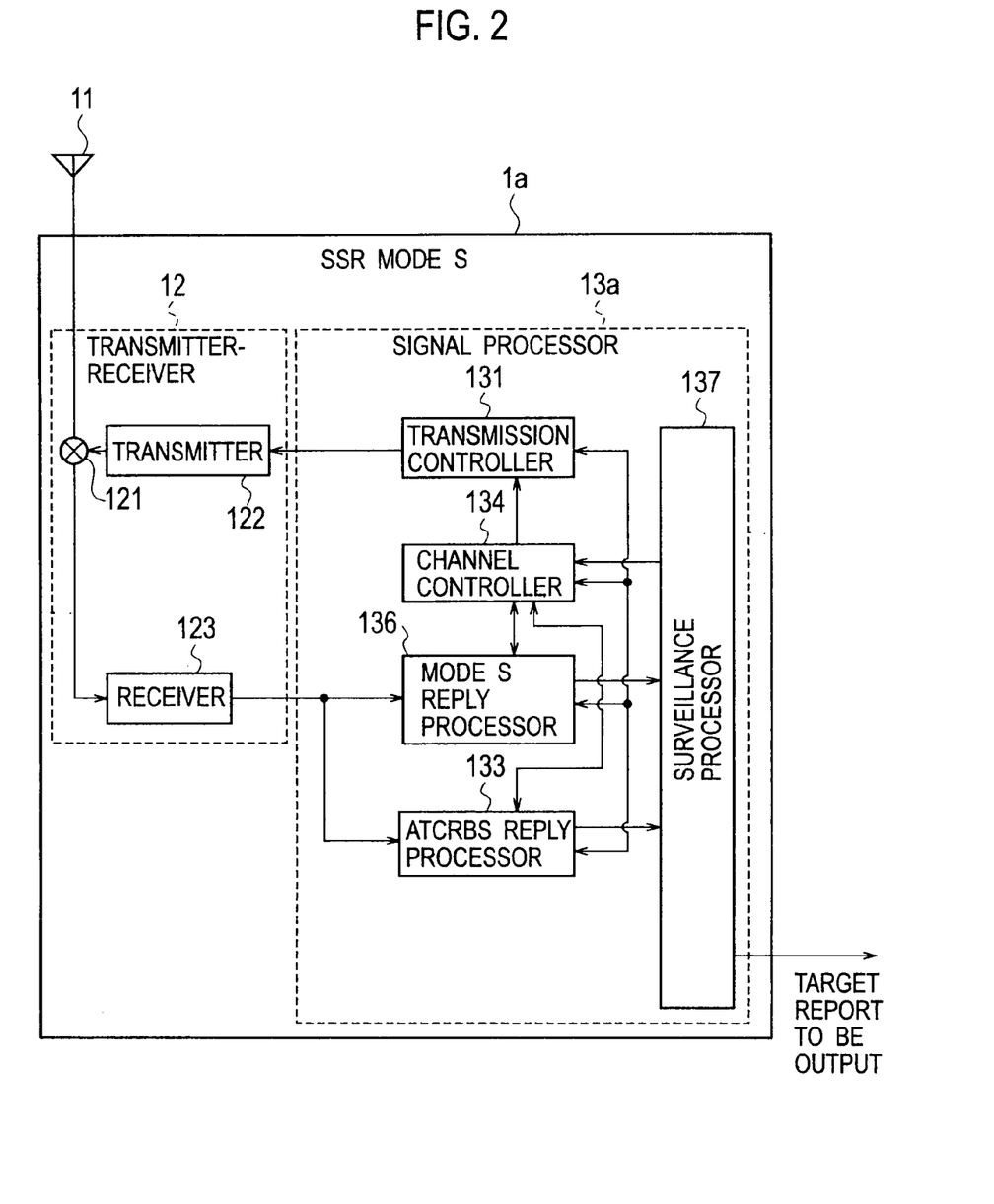
FIG. 2 is a functional block diagram of the SSR mode S of FIG. 1.

As illustrated in FIG. 2, the SSR mode S 1a has the transmitter-receiver 12 including a transmission-reception selector 121 for selection between signal transmission and reception, a transmitter 122 for transmission of interrogations, and a receiver 123 for reception of replies. Further, the SSR mode S 1a has the signal processor 13a including a transmission controller 131 for controlling the transmission of interrogations, a mode S reply processor 136 for processing replies received from mode S aircraft, an ATCRBS reply processor 133 for processing replies received from ATCRBS aircraft, a surveillance processor 137 making use of received replies for preparation of target reports to survey flights of aircraft, and a channel controller 134 for controlling transactions in all-call time periods and roll-call time periods.

Figure 3:
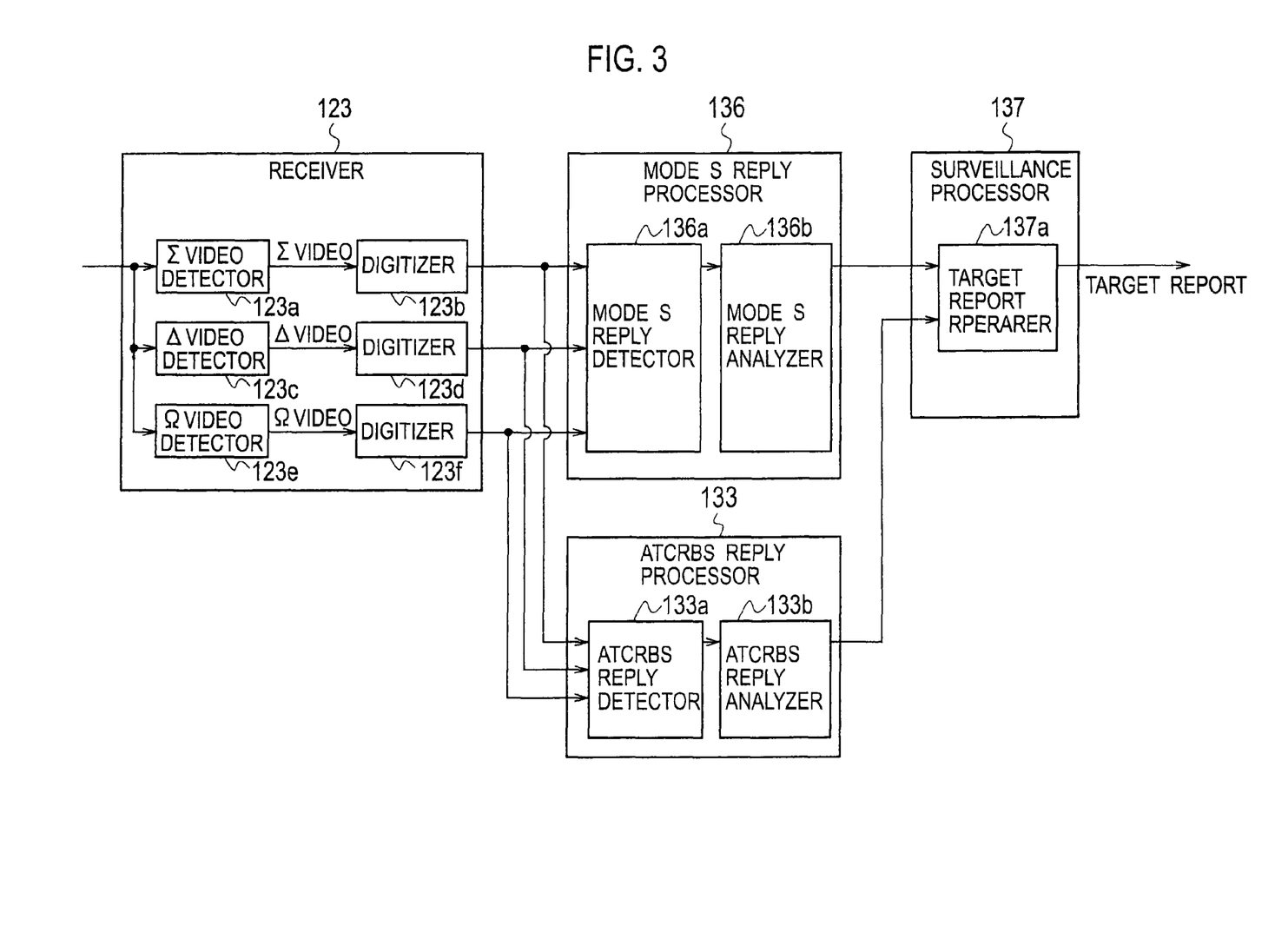
FIG. 3 is a functional block diagram of essential portions of the SSR mode S of FIG. 2.

More specifically, as illustrated in FIG. 3, the receiver 123 includes a Σvideo detector 123a for detecting Σvideo from received signals, a digitizer 123b for digitizing detected Σ video, a Δvideo detector 123c for detecting Δvideo, a digitizer 123d for digitizing detected Δvideo, a Ωvideo detector 123e for detecting Ωvideo, and a digitizer 123f for digitizing detected Ωvideo.

Further, as illustrated in FIG. 3, the mode S reply processor 136 includes a mode S reply detector 136a for detecting, from among digitized signals from the digitizers 123b, 123d, and 123f, mode S replies transmitted from mode S aircraft, and a mode S reply analyzer 136b for analyzing detected mode S replies. On the other hand, the ATCRBS reply processor 133 includes an ATCRBS reply detector 133a for detecting, from among digitized signals from the digitizers 123b, 123d, and 123f, ATCRBS replies transmitted from ATCRBS aircraft, and an ATCRBS reply analyzer 133b for analyzing detected ATCRBS replies.

Further, the surveillance processor 137 includes a target report preparer 137a adapted to make use of results of analyses by the analyzers 133b and 136b, for preparing target reports.

Figure 4:
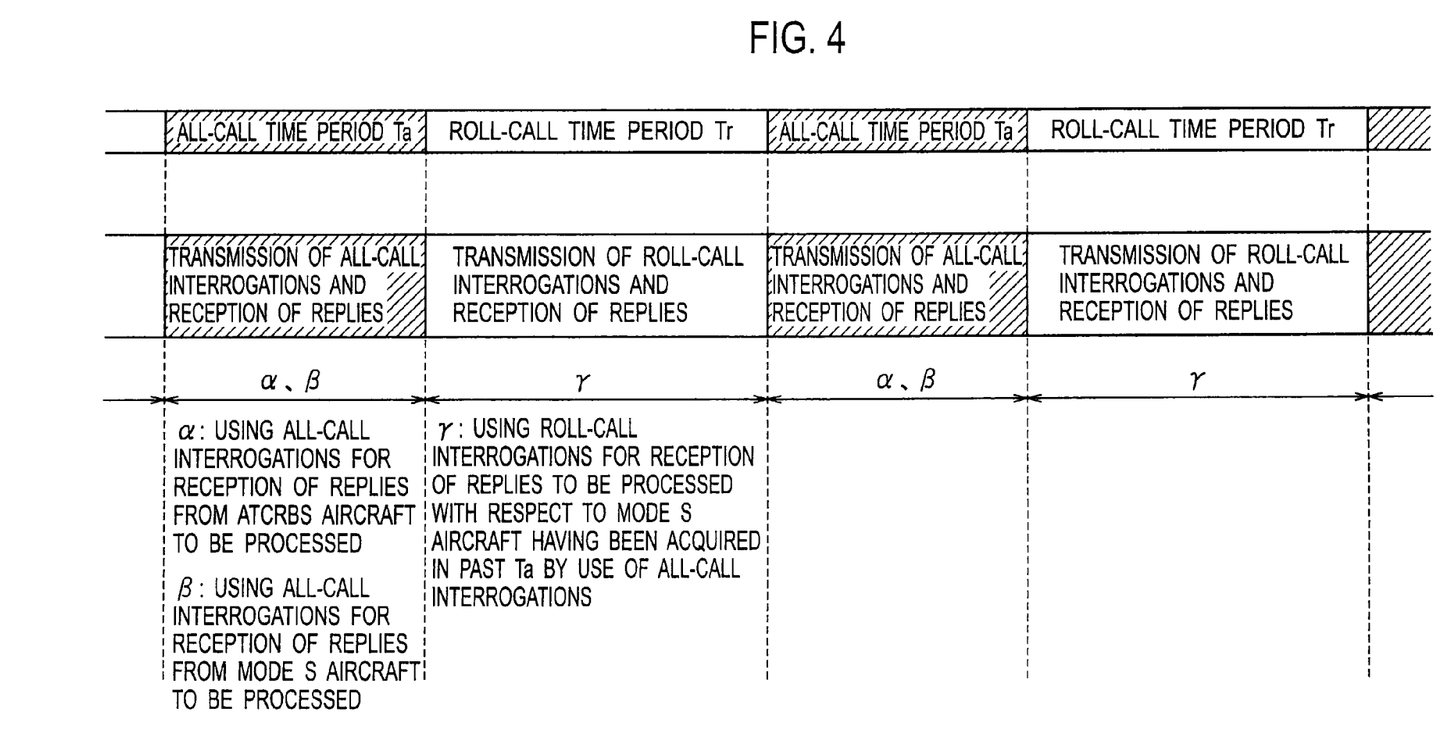
FIG. 4 is a time chart of essential actions of the SSR mode S of FIG. 2.

The SSR mode S 1a is configured, as illustrated in FIG. 4, for time division into all-call time periods Ta and roll-call time periods Tr according to, among others, prescribed repetition periods and coverage area, to proceed with processes for acquiring ATCRBS aircraft and mode S aircraft. More specifically, the SSR mode S 1a has the transmission controller 131 adapted in all-call time periods Ta for transmission of all-call interrogations to acquire ATCRBS aircraft and mode S aircraft, and in roll-call time periods Tr for transmission of roll-call interrogations to keep acquisition of mode S aircraft having been acquired in all-call time periods Ta, for a processing to enable acquisition of all aircraft within a coverage (refer to Japanese Patent Application Laid-Open Publication No. 2007-248296, and "Secondary Surveillance Radar, Michael C. Stevens, 1998, ISBN 0-89006-292-7").

However, the SSR mode S 1a may have an increased number of aircraft within the coverage, which might overlap addition of a datalink function, which would constitute a difficulty in acquisition of all aircraft within the coverage, thus shedding light on the importance of efficient use of the periods Ta and Tr.

Figure 5A:
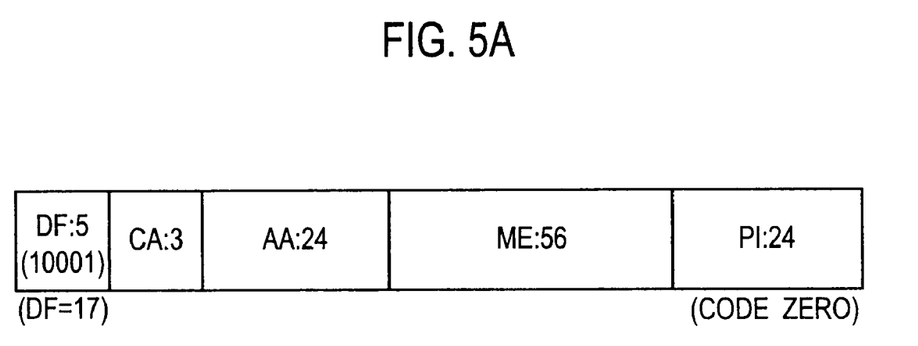
FIG. 5A and FIG. 5B is a set of exemplary formats of extended squitters.
Figure 5B:
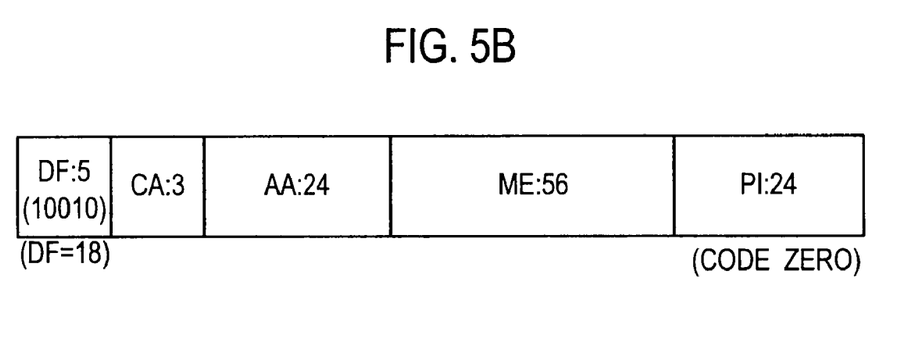

In the meanwhile, aircraft is configured to transmit, besides the reply to be transmitted in response to an interrogation transmitted from the SSR mode S 1a, an extended squitter for use in the ADS-B (automatic dependent surveillance-broadcast). The extended squitter is a signal that is formatted, as illustrated in FIG. 5A and FIG. 5B, with fields of contents including "CA (transponder capability)", "AA (address announced: transponder mode S address)", "ME (message extend squitter: aircraft position, velocity, etc)", and "PI (parity/interrogator identifies)". The SSR mode S 1a may thus receive extended squitters, but is configured to use no extended squitters it has received.

As having been described, there is a conventional SSR mode S 1a that may have an increased number of aircraft within a coverage, which might overlap addition of a datalink function, which would constitute a difficulty to acquire all aircraft within the coverage. On the other hand, there is an extended squitter to be received irrespective of replies, which is not made use of at the SSR mode S 1a.

With this point in view, it is an object of the present invention to provide a secondary surveillance radar adapted for utilization of an extended squitter transmitted from mode S aircraft to perform surveillance of aircraft.

SUMMARY OF THE INVENTION

According to an aspect of the present invention, a secondary surveillance radar comprises a transmitter configured to transmit interrogations to aircraft airborne in a coverage, a receiver configured to receive signals transmitted from aircraft airborne in the coverage, a reply analyzer configured to analyze a reply responding to an interrogation transmitted from the transmitter, as the reply is detected from signals received by the receiver, and a squitter analyzer configured to analyze an extended squitter, as the extended squitter is detected from the signals received by the receiver.

DETAILED DESCRIPTION OF THE EMBODIMENTS

Figure 6:
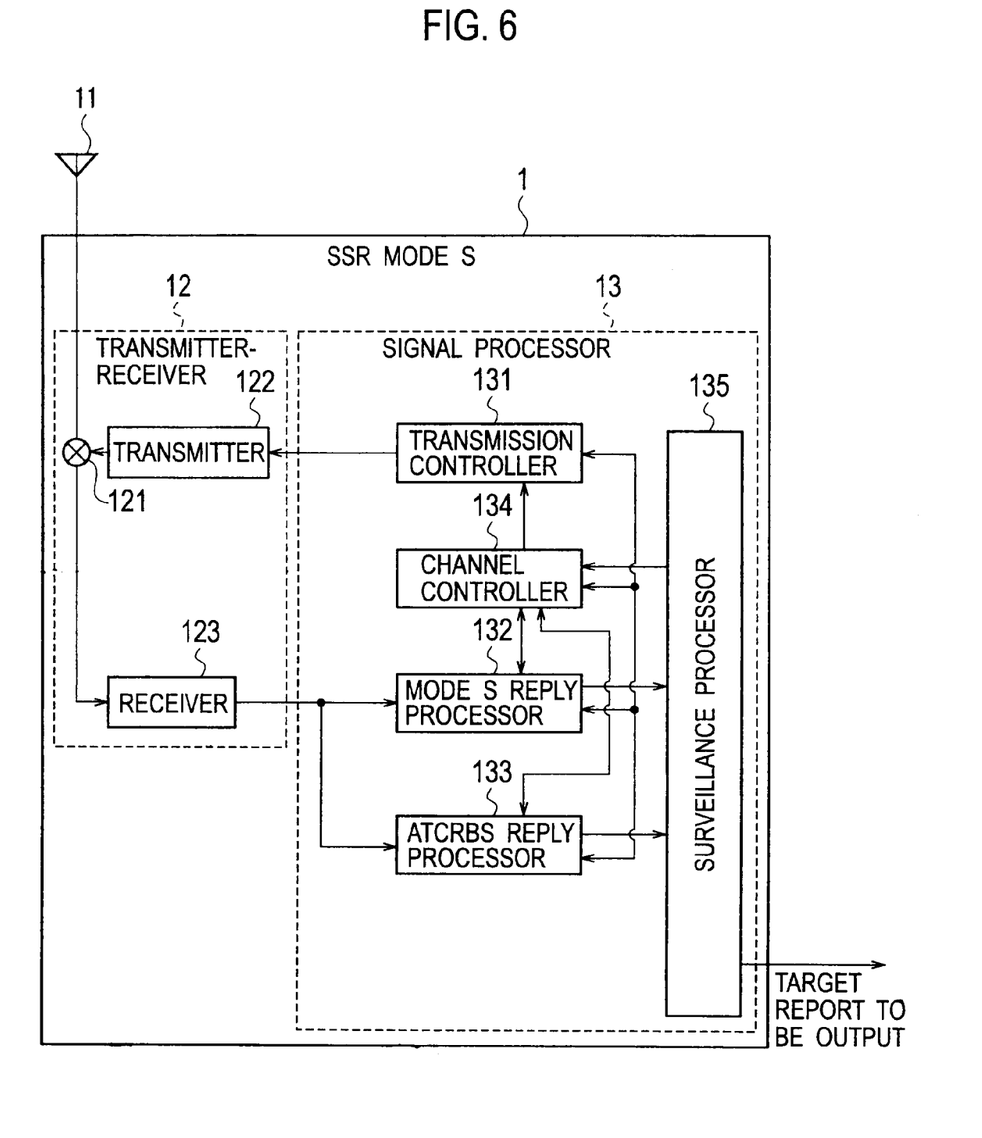
FIG. 6 is a functional block diagram of an SSR mode S according to an embodiment of the present invention.

There will be described the preferred embodiments of the present invention. Like elements to the conventional configuration will be designated by like reference characters. FIG. 6 illustrates an SSR mode S 1 according to an embodiment of the present invention. Like the SSR mode S 1a of FIG. 1, the SSR mode S 1 of FIG. 6 is installed at a ground station, and configured for surveillance of aircraft 2 on bases of transactions with transponders 20 of aircraft 2.

As shown in FIG. 6, the SSR mode S 1 includes an antenna 11, a transmitter-receiver 12 configured for signal transmission and reception through the antenna 11, and a signal processor 13 connected to the transmitter-receiver 12, and configured to implement transaction control, and prepare target reports to be output in accordance with received replies.

The transmitter-receiver 12 is provided with a transmission-reception selector 121, a transmitter 122, and a receiver 123, and configured for transmission of interrogations through the antenna 11, and for handling replies received at the antenna 11 to output to the signal processor 13.

The signal processor 13 includes a transmission controller 131 configured to control transmission of interrogations, a mode S reply processor 132 configured to process received mode S replies, an ATCRBS reply processor 133 configured to process received ATCRBS replies, a channel controller 134 configured to schedule transactions in all-call time periods and roll-call time periods, and a surveillance processor 135 configured to make use of replies for preparation of target reports.

Figure 7:
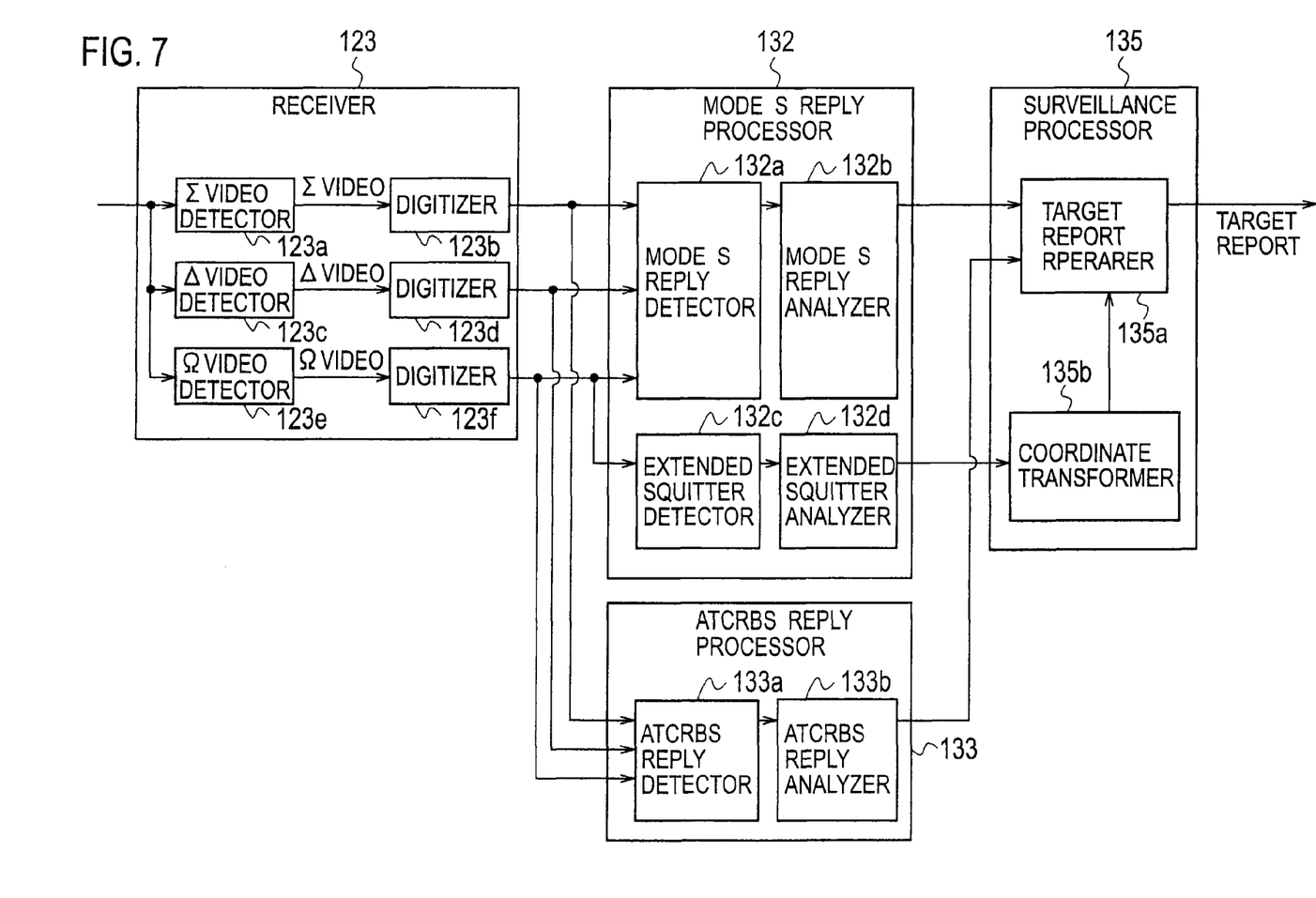
FIG. 7 is a functional block diagram of essential portions of the SSR mode S of FIG. 6.

More specifically, as shown in FIG. 7, the receiver 123 includes: a$\Sigma$video receiver composed of a $\Sigma$video detector 123a for detecting $\Sigma$video from received signals, and a digitizer 123b for digitizing detected $\Sigma$video; a $\Delta$video receiver composed of a $\Delta$video detector 123c for detecting $\Delta$video from received signals, and a digitizer 123d for digitizing detected $\Delta$video; and a $\Omega$video receiver composed of a $\Omega$video detector 123e for detecting $\Omega$video from received signals, and a digitizer 123f for digitizing detected $\Omega$video. At the receiver 123, the digitizers 123b, 123d, and 123f are each respectively adapted to output digitized video to the mode S reply processor 132 and the ATCRBS reply processor 133.

As shown in FIG. 7, the mode S reply processor 132 includes: a mode S reply detector 132a configured to have digitized $\Sigma$video, $\Delta$video, and $\Omega$video input from the receiver 123, for detection of mode S replies transmitted from aircraft 2 in response to interrogations the transmitter 122 has transmitted; a mode S reply analyzer 132b configured for analyses of mode S replies detected by the mode S reply detector 132a to output the results to the surveillance processor 135; an extended squitter detector 132c configured to have digitized $\Omega$video input from the receiver 123, for detection of extended squitters transmitted from aircraft 2; and an extended squitter analyzer 132d configured for analyses of extended squitters detected by the extended squitter detector 132c to output the results to the surveillance processor 135.

As shown in FIG. 7, the ATCRBS reply processor 133 includes: an ATCRBS reply detector 133a configured to have digitized $\Sigma$video, $\Delta$video, and $\Omega$video input from the receiver 123, for detection of ATCRBS replies transmitted from aircraft 2 in response to interrogations the transmitter 122 has transmitted; and an ATCRBS reply analyzer 133b configured for analyses of ATCRBS replies detected by the ATCRBS reply detector 133a to output the results to the surveillance processor 135.

As shown in FIG. 7, the surveillance processor 135 includes a target report preparer 135a configured for use of analysis results of replies and extended squitters to prepare target reports, and a coordinate transformer 135b configured to transform coordinates of extended squitters.

Figure 8:
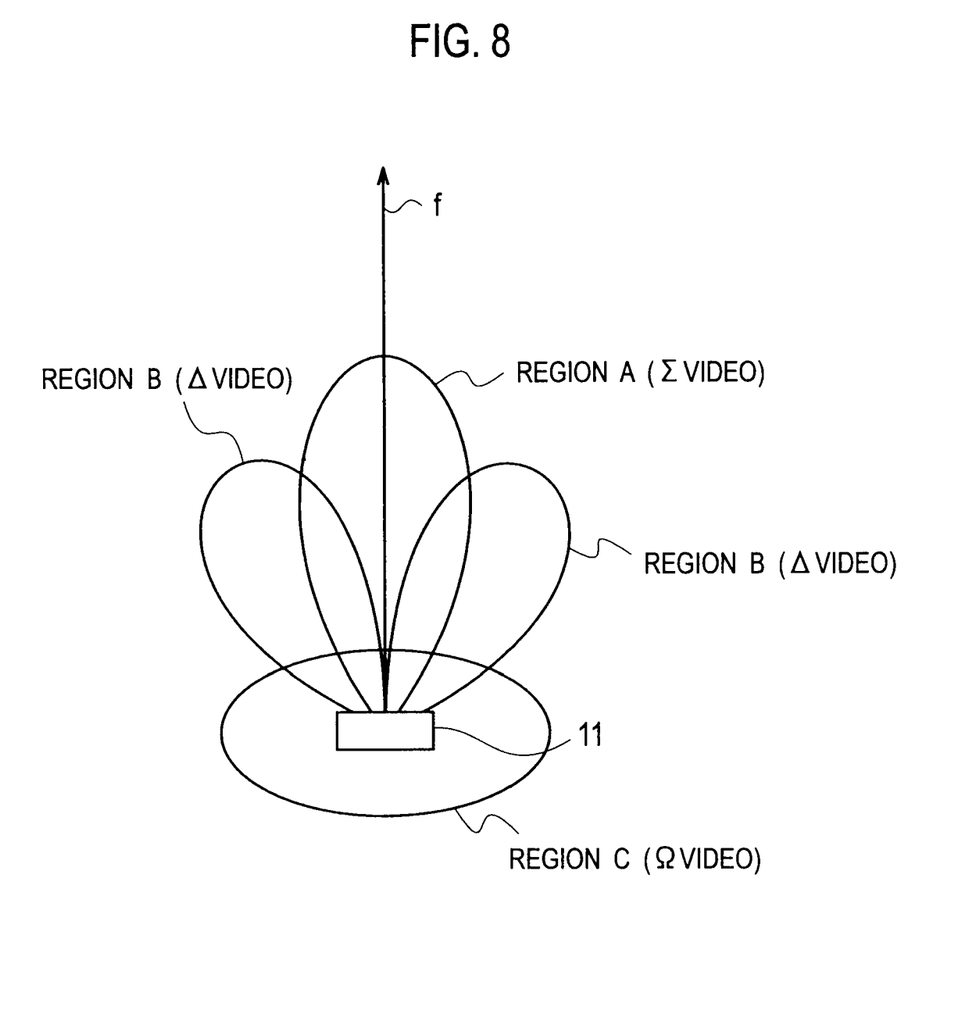
FIG. 8 is an illustration of lobes of an antenna of the SSR mode S of FIG. 6.

As illustrated in FIG. 8, $\Sigma$video is a set of signals received from within a region A of a lobe extending along a center axis of the antenna 11 in a frontward direction f of the antenna 11. $\Delta$video is a set of signals received from within regions B of lobes about the frontward direction f of antenna 11. $\Omega$video is a set of signals received from a widespread region C.

As illustrated in FIG. 8, $\Sigma$video and $\Delta$video appear as directional signals, and can only be used for transactions with aircraft airborne in prescribed (azimuth) ranges with respect to the antenna 11. On the other hand, $\Omega$video appears as a non-directional signal, and can be used for communications with aircraft airborne in a widespread (azimuth) range with respect to the antenna 11. It is noted that all-call interrogations and replies as well as roll-call interrogations and replies are intended to use simply for targets airborne in the prescribed (azimuth) ranges with respect to the antenna 11. In use of non-directional $\Omega$video, there come replies (fruits, squitters, etc) from any and all transponders as targets.

More specifically, the extended squitter analyzer 132d decodes respective data blocks of extended squitters detected by the extended squitter detector 132c, and outputs the results to the surveillance processor 135. Extended squitters are formatted as illustrated in FIG. 5A and FIG. 5B, including a field of PI (parity /interrogator identifier) to be "0" in value, so the extended squitter analyzer 132d outputs a decoded result to the surveillance processor 135, simply when the PI field has the value "0", and a field of DF (downlink format) is "10001" in value for DF=17 or "10010" in value for DF=18.

The coordinate transformer 135b transforms positional information contained in extended squitters into positional information compliant with replies. That is, those replies analyzed by the mode S reply analyzer 132b or the ATCRBS reply analyzer 133b each contain, as positional information of aircraft 2, such a coordinate (slant range, azimuth) that represents a location of aircraft 2 with respect to the SSR mode S 1. On the other hand, those extended squitters analyzed by the extended squitter analyzer 132d each contain, as positional information of aircraft 2, such a combination of latitude and longitude that represents a location of aircraft 2. Therefore, the coordinate transformer 135b transforms a combination of latitude and longitude analyzed by the extended squitter analyzer 132d, into such a coordinate (slant range, azimuth) that defines a location of aircraft 2.

The SSR mode S 1 is configured to process also extended squitters received from aircraft 2, as described. Extended squitters are signals periodically transmitted from aircraft 2, so the SSR mode S 1 receives such extended squitters at timings independent of all-call time periods Ta and roll-call time periods Tr. Therefore, as shown in FIG. 9, the mode S reply processor 132 is adapted to process received extended squitters irrespective of all-call time periods Ta and roll-call time periods Tr.

Figure 9:
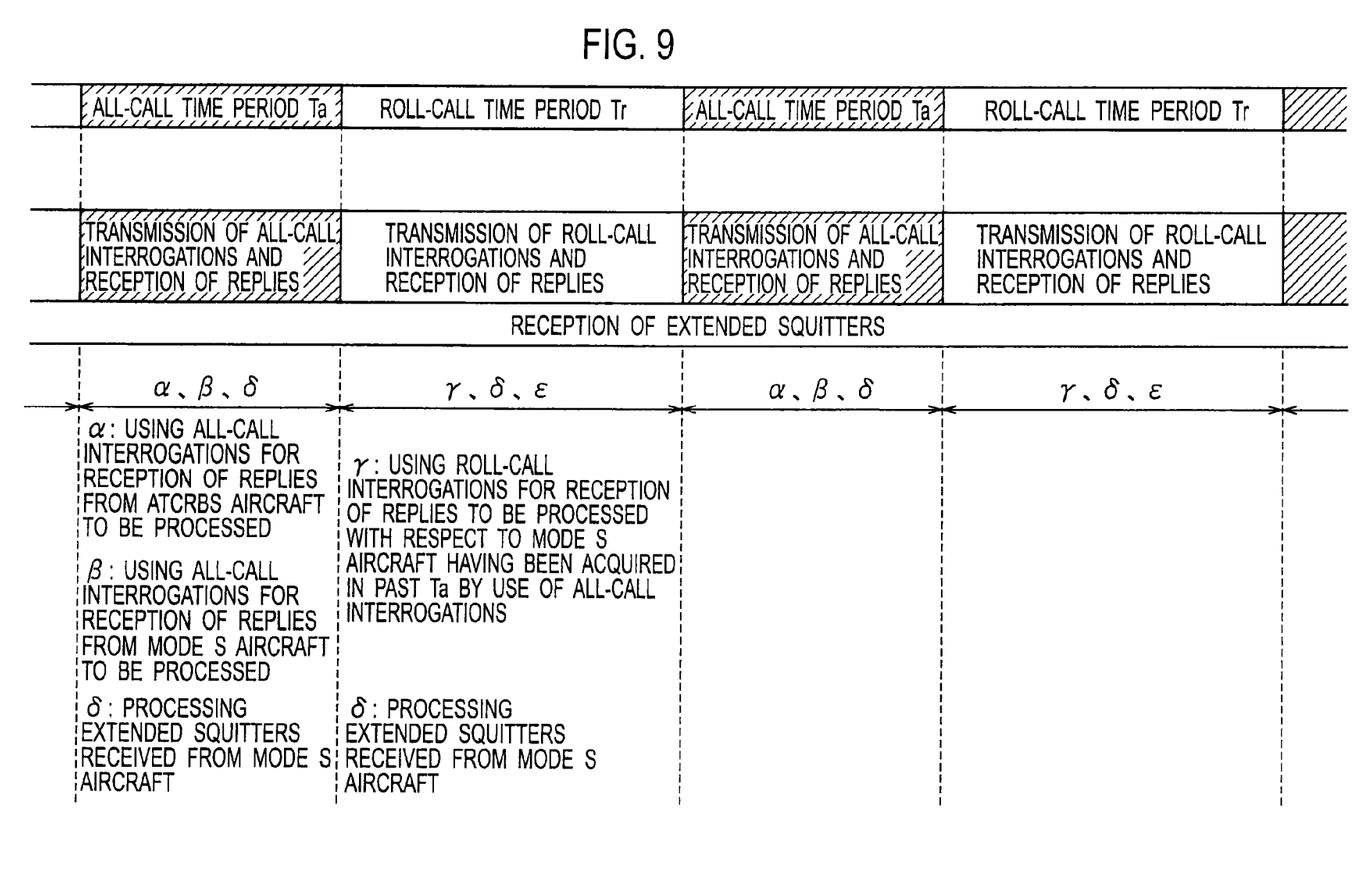
FIG. 9 is a time chart of essential actions of the SSR mode S of FIG. 6.

More specifically, as shown in FIG. 9, the SSR mode S 1 is adapted in each all-call time period Ta to transmit all-call interrogations to mode S aircraft and ATCRBS aircraft, thereby receiving replies, processing ($\alpha$, $\beta$) them, while processing ($\delta$) extended squitters received from mode S aircraft. Further, in each roll-call time period Tr, the SSR mode S 1 is adapted to transmit selective interrogations to mode S aircraft having had replies received by the SSR mode S 1 in past all-call time periods Ta, thereby receiving replies, processing ($\gamma$) them, while processing ($\delta$) received extended squitters. In roll-call time period Tr also, the SSR mode S 1 is adapted to process ($\delta$) extended squitters received from mode S aircraft.

According to the embodiment of the present invention, the SSR mode S 1 makes use not simply of information contained in mode S replies or ATCRBS replies, but also of information contained in extended squitters, for preparation of target reports. Accordingly, the SSR mode S 1 making use of extended squitter is permitted to acquire additional information on aircraft that might not have been caught in any way by conventional transactions only, thus allowing for an enhanced capability in surveillance of aircraft.

What is claimed is:

1. A secondary surveillance radar comprising:
a transmitter configured to transmit interrogations to aircraft airborne in a coverage;
a receiver configured to receive signals transmitted from aircraft airborne in the coverage;
a reply analyzer configured to analyze a reply responding to an interrogation transmitted from the transmitter, as the reply is detected from signals received by the receiver;
a squitter analyzer configured to analyze an extended squitter detected from received $\Omega$video signals, among the signals received, as the extended squitter is detected from the signals received by the receiver;
a coordinate transformer configured to determine from the extended squitter analyzed by the squitter analyzer a combination of latitude and longitude representing a location of aircraft having transmitted the extended squitter, and transform the combination of latitude and longitude into a coordinate defining the location of aircraft with respect to SSR mode S; and
a surveillance processor configured to prepare a target report for surveillance of aircraft in accordance with an analysis result of the reply analyzer and an analysis result of the squitter analyzer.

\* \* \* \* \*